(12) United States Patent
Jung

(10) Patent No.: US 10,082,712 B2
(45) Date of Patent: Sep. 25, 2018

(54) LIQUID CRYSTAL DISPLAY APPARATUS

(71) Applicant: LG Display Co., Ltd., Seoul (KR)

(72) Inventor: JinHyung Jung, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 94 days.

(21) Appl. No.: 15/220,085

(22) Filed: Jul. 26, 2016

(65) Prior Publication Data

US 2017/0031217 A1  Feb. 2, 2017

(30) Foreign Application Priority Data

Jul. 31, 2015  (KR) .................. 10-2015-0109178

(51) Int. Cl.

| | |
|---|---|
| *G02F 1/1339* | (2006.01) |
| *G02F 1/1343* | (2006.01) |
| *G02F 1/1345* | (2006.01) |
| *G02F 1/1335* | (2006.01) |
| G02F 1/1362 | (2006.01) |
| G02F 1/1333 | (2006.01) |
| G02F 1/137 | (2006.01) |

(52) U.S. Cl.
CPC ...... *G02F 1/134363* (2013.01); *G02F 1/1339* (2013.01); *G02F 1/1345* (2013.01); *G02F 1/13439* (2013.01); *G02F 1/13454* (2013.01); *G02F 1/133512* (2013.01); *G02F 1/136227* (2013.01); *G02F 2001/13629* (2013.01); *G02F 2001/13706* (2013.01); *G02F 2001/133388* (2013.01); *G02F 2001/134318* (2013.01); *G02F 2201/121* (2013.01); *G02F 2201/123* (2013.01)

(58) Field of Classification Search
None
See application file for complete search history.

(56) References Cited

U.S. PATENT DOCUMENTS

2005/0151920 A1\* 7/2005 Watanabe ......... G02F 1/133512
349/153
2014/0022479 A1\* 1/2014 Hosaka ................ G02F 1/1368
349/43

FOREIGN PATENT DOCUMENTS

JP  2003043462 A  2/2003

OTHER PUBLICATIONS

European Search Report for European Patent Application No. EP 16 181 406.6, dated Dec. 7, 2016, 12 Pages.

\* cited by examiner

*Primary Examiner* — Richard Kim
(74) *Attorney, Agent, or Firm* — Fenwick & West LLP

(57) ABSTRACT

Provided is a liquid crystal display apparatus. The liquid crystal display apparatus includes: a pixel area including a pixel array disposed on a first substrate; a peripheral area including a gate driver disposed outside the pixel array and a common voltage supply unit including openings disposed outside the gate driver; an overcoating layer disposed on the pixel array and the gate driver; a pixel electrode disposed on the overcoating layer and connected to the pixel array; a common electrode structure disposed on the overcoating layer, overlapped with the pixel electrode, and electrically connected to the common voltage supply unit; and a sealing member surrounding a liquid crystal layer disposed between the first substrate and a second substrate facing the first substrate, supporting the first substrate and the second substrate, and overlapped with the openings.

15 Claims, 9 Drawing Sheets

LIQUID CRYSTAL DISPLAY APPARATUS

CROSS-REFERENCE TO RELATED APPLICATIONS

This application claims priority to Korean Patent Application No. 10-2015-0109178 filed on Jul. 31, 2015, in the Korean Intellectual Property Office, the disclosure of which is incorporated by reference in its entirety.

BACKGROUND

Technical Field

The present disclosure relates to a liquid crystal display apparatus and more particularly, to a liquid crystal display apparatus including a common voltage supply unit and a common electrode structure.

Description of the Related Art

As the world entered the information age, the field of display devices for visually displaying electrical information signals has grown rapidly. Thus, studies for improving performance, such as thinner profile, lighter weight, and lower power consumption, of various display devices have continued. Examples of the display devices include a plasma display panel device (PDP), a field emission display device (FED), an electro-wetting display device (EWD), an organic light emitting display device (OLED), a liquid crystal display device (LCD), and the like.

The liquid crystal display device can be manufactured into a lightweight and thin form and thus is being widely adopted in various electronic devices.

In the liquid crystal display device, a pixel area of a liquid crystal panel is configured to display an image. A peripheral area is configured to surround the pixel area and include various lines and circuit units required for driving the pixel area. Further, in the liquid crystal display device, a backlight is provided on a rear surface of the liquid crystal panel and supplies a light to the liquid crystal panel.

SUMMARY

Generally, as the size of a liquid crystal panel is increased, a line width of a common voltage supply unit configured to supply a common voltage (Vcom) in a peripheral area is increased in order to bear a load applied to the liquid crystal panel. Therefore, generally, the width of a bezel area (peripheral area) of the liquid crystal panel is increased.

Further, generally, as the size of a liquid crystal panel is increased, the weight of a first substrate and a second substrate are increased. Therefore, generally, the width of a sealing member configured to adhere the first substrate to the second substrate is increased in order to maintain the reliability in bonding force. Thus, generally, the width of a bezel area (peripheral area) is increased.

The inventors of the present disclosure have performed research and development of a liquid crystal display apparatus which can implement a narrow bezel by reducing the width of a bezel area of a liquid crystal panel for in an in-plane switching (IPS) type liquid crystal display apparatus.

Specifically, the inventors have developed a liquid crystal display apparatus including an in-plane switching (IPS) liquid crystal panel which can realize a narrow bezel and achieve high resolution and can be manufactured to a large size.

The inventors of the present disclosure have studied a method for reducing the width of the sealing member configured to bond the first substrate and the second substrate in order to reduce the width of the bezel area of the liquid crystal display apparatus. If the width of the sealing member is reduced, the width of the bezel area can be reduced. However, it was found out that a bonding force of the sealing member decreases, which may cause a problem with the reliability of the liquid crystal panel due to problems with the bonding between the first substrate and the second substrate.

Further, The inventors of the present disclosure have developed a method for reducing the width of the common voltage supply unit in order to reduce the width of the bezel area of the liquid crystal panel. In this case, the width of the bezel area can be reduced. However, it was found out that a line resistance ($\Omega$) of the common voltage supply unit increases, which may cause deterioration in image quality.

Accordingly, an object of the present disclosure is to provide a liquid crystal display apparatus including a novel common voltage supply unit. In the liquid crystal display apparatus, a bonding force of a sealing member can be increased, a line resistance of the common voltage supply unit can be reduced, and the width of a bezel area can be reduced.

Another object of the present disclosure is to provide a liquid crystal display apparatus including a novel common electrode structure. The liquid crystal display apparatus can be manufactured to a large size with a further reduced width of a bezel area.

Yet another object of the present disclosure is to provide a liquid crystal display apparatus including a novel patterned common electrode structure. In the liquid crystal display apparatus, the width of a bezel area can be reduced by reducing the width of a gate driver.

The objects of the present disclosure are not limited to the aforementioned objects, and other objects, which are not mentioned above, will be apparent to a person having ordinary skill in the art from the following description.

According to an aspect of the present disclosure, there is provided a liquid crystal display apparatus. The liquid crystal display apparatus includes: a pixel area including a pixel array disposed on a first substrate; a peripheral area including a gate driver disposed outside the pixel array and a common voltage supply unit including openings disposed outside the gate driver; an overcoating layer disposed on the pixel array and the gate driver; a pixel electrode disposed on the overcoating layer and connected to the pixel array; a common electrode structure disposed on the overcoating layer, overlapped with the pixel electrode, and electrically connected to the common voltage supply unit; and a sealing member configured to surround a liquid crystal layer disposed between the first substrate and a second substrate facing the first substrate, supporting the first substrate and the second substrate, and overlapped with the openings.

Details of other exemplary embodiments will be included in the detailed description of the disclosure and the accompanying drawings.

According to the present disclosure, a novel alignment structure of a sealing member and a common voltage supply unit is provided. Thus, it is possible to increase a bonding force between a first substrate and a second substrate, reduce a line resistance of the common voltage supply unit, and reduce the width of a bezel area.

According to the present disclosure, a novel common electrode structure is provided. Thus, it is possible to manufacture a liquid crystal display apparatus to a large size with a further reduced width of the bezel area. Therefore, it is possible to provide a large-size television TV and the like.

According to the present disclosure, a novel patterned common electrode structure is provided. Thus, it is possible to reduce the width of a gate driver and also possible to reduce the width of the bezel area.

The effects of the present disclosure are not limited to the aforementioned advantages, and various other advantages are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
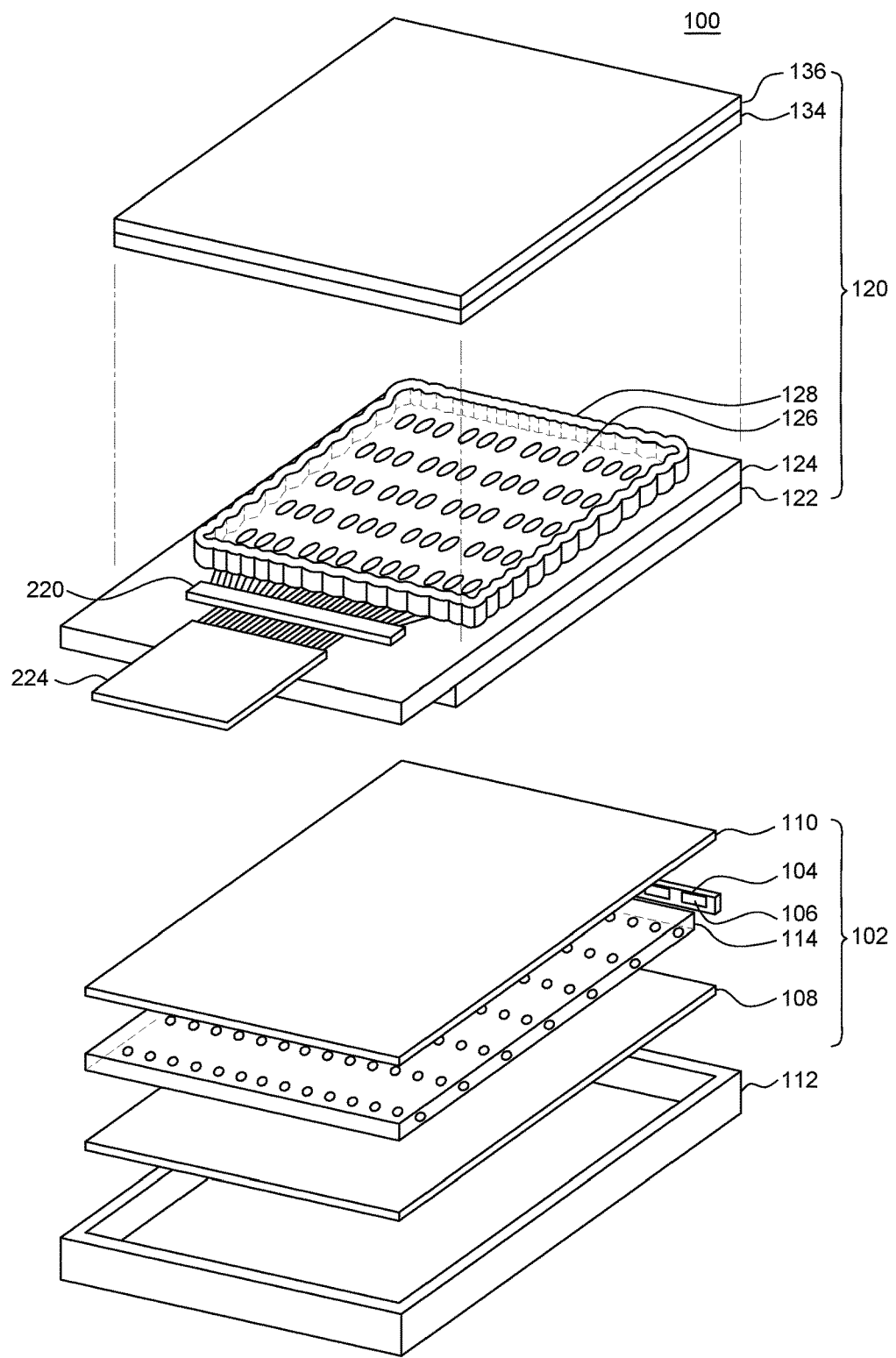
FIG. 1 is an exploded perspective view of a liquid crystal display apparatus according to an exemplary embodiment of the present disclosure.

Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the present specification. Further, in the following description, a detailed explanation of known related technologies may be omitted to avoid unnecessarily obscuring the subject matter of the present disclosure. The terms such as "including," "having," and "comprise of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Throughout the whole specification, the same reference numerals denote the same elements.

Since size and thickness of each component illustrated in the drawings are represented for convenience in explanation, the present disclosure is not necessarily limited to the illustrated size and thickness of each component.

The features of various embodiments of the present disclosure can be partially or entirely bonded to or combined with each other and can be interlocked and operated in technically various ways as can be fully understood by a person having ordinary skill in the art, and the embodiments can be carried out independently of or in association with each other. Hereinafter, exemplary embodiments of the present disclosure will be described with reference to the accompanying drawings.

FIG. 1 is an exploded perspective view of a liquid crystal display apparatus according to an exemplary embodiment of the present disclosure.

Referring to FIG. 1, a liquid crystal display apparatus 100 includes a liquid crystal panel 120 and a light source unit 102.

The light source unit 102 includes a light source circuit unit 104, a light source 106, a reflecting plate 108, an optical sheet 110, and a supporting unit 112. Herein, the light source unit 102 is an edge-type light source unit and thus may further include a light guiding plate 114. But the present disclosure is not limited to any type, structure, or shape of the light source unit.

The light source circuit unit 104 functions to supply an electrical signal to the light source 106. A plurality of light sources 106 are disposed on the light source circuit unit 104 at a predetermined distance. The light source circuit unit 104 may be configured as a part of a printed circuit board, an electrical line, or a connector, but is not limited thereto.

Various light sources may be applied as the light source 106. For example, a light emitting diode (LED) or a fluorescent lamp may be applied as the light source 106. Herein, the light source 106 is configured to emit white light.

In some exemplary embodiments, the light source 106 may further include fluorescent materials, quantum dots, or nano-crystals. Herein, a light emission spectrum of the light source 106 may be a blue wavelength band, but is not limited thereto.

A light incident surface of the light guiding plate 114 is disposed to correspond to a light emission direction of the light source 106. A scattering pattern is formed on a rear surface of the light guiding plate 114. The scattering pattern may be formed as dots, or may be formed in various other shapes.

In some exemplary embodiments, fluorescent materials, quantum dots, or nano-crystals may be further disposed on at least one surface of the light guiding plate 114. In this case, the light source 106 may be configured to emit blue light, but is not limited thereto.

The reflecting plate 108 is disposed under a rear surface of the light guiding plate 114. The reflecting plate 108 reflects light emitted from the light source 106 in a direction toward the liquid crystal panel 120.

The optical sheet 110 is disposed under a rear surface of the liquid crystal panel 120. The optical sheet 110 may be a diffusion sheet configured to improve the brightness uniformity of the liquid crystal display apparatus 100, a prism sheet configured to improve the brightness of the liquid crystal display apparatus 100, or the like. Otherwise, the optical sheet 110 may be configured as a multi-functional optical sheet including the diffusion sheet function and the prism sheet function, but is not limited thereto. The optical sheet 110 may be configured as one or more optical sheets.

The supporting unit 112 functions to support at least one of the light source circuit unit 104, the light source 106, the reflecting plate 108, and the optical sheet 110. The supporting unit 112 may be formed of metal and/or plastic. The supporting unit 112 is configured to surround lateral surfaces of the light source 106 and the light guiding plate 114, but is not limited thereto.

In some exemplary embodiments, the supporting unit 112 may be configured to further include glass fiber in order to reduce thermal expansion of the supporting unit 112 of the liquid crystal display apparatus 100.

In some exemplary embodiments, the light source circuit unit 104, the light source 106, the reflecting plate 108, and/or the optical sheet 110 may be supported by only a metal foil, adhesive tape or double-sided tape in order to manufacture the supporting unit 112 of the liquid crystal display apparatus 100 into a thin and lightweight form.

In some exemplary embodiments, the light source unit 102 may be a direct-type light source unit rather than an edge-type light source unit. A direct-type light source emits light towards the liquid crystal panel 120. Thus, the light guiding plate 114 is not needed. Particularly, each of the light sources 106 can be driven individually. Therefore, the direct-type light source unit has an advantage of being able to implement an excellent contrast ratio by a local dimming driving method. Further, the direct-type light source unit can directly supply a high-brightness light source to the liquid crystal panel 120. Therefore, the direct-type light source unit has an advantage of being able to implement a brightness of 800 nits or more, which is considered for example, as a high dynamic range (HDR) operation.

The liquid crystal panel 120 is disposed to correspond to one surface of the light source unit 102 and configured to be supplied with light emitted from the light source. The liquid crystal panel 120 may include at least a first polarizing film 122, a first substrate 124, a liquid crystal layer 126, a sealing member 128, a second substrate 134, and a second polarizing film 136.

The first polarizing film 122 is disposed on a rear surface of the first substrate 124 and functions to polarize light incident from the light source unit 102 into the first substrate 124. The second polarizing film 136 is disposed on an upper surface of the second substrate 134 and functions to polarize light passing through the second substrate 134.

The components disposed on the first substrate 124 control the liquid crystal layer 126. Specifically, a polarization axis of polarized light incident into the first substrate 124 through the first polarizing film 122 is rotated by rotation of a liquid crystal in the liquid crystal layer 126. In this case, the degree of rotation of the polarization axis is controlled by an electric field generated corresponding to an image signal. The first substrate 124 is formed of a material suitable for deposition of a semiconductor, a metal line, an organic material, an inorganic material, or the like. For example, glass or plastic, such as polyimide, having excellent heat resistance and chemical resistance may be used for the first substrate 124.

The liquid crystal layer 126 is interposed between the first substrate 124 and the second substrate 134. The liquid crystal layer 126 refers to a layer including liquid crystal molecules in a state between a liquid and a solid with properties of a liquid, such as fluidity, and properties of a solid, such as a long range order. The liquid crystal molecules have, for example, a rod-like structure. The liquid crystal molecules have an anisotropic property such that the liquid crystal molecules have different characteristics in a direction parallel to a long axis and in a direction perpendicular to the long axis. The liquid crystal molecules have a dielectric anisotropy in which a dielectric constant $\varepsilon_{\|}$ in a long axis direction and a dielectric constant $\varepsilon_{\perp}$ in a direction perpendicular to the long axis are different from each other. The liquid crystal layer 126 may include a negative-type (N-type) liquid crystal layer. In the negative-type liquid crystal molecules, a dielectric constant $\varepsilon_{\|}$ in a long axis direction is smaller than a dielectric constant $\varepsilon_{\perp}$ in a direction perpendicular to the long axis. Particularly, the N-type liquid crystal molecules have a higher transmittance than positive-type (P-type) liquid crystal molecules. Since the liquid crystal display apparatus 100 includes the N-type liquid crystal layer, the maximum brightness and contrast ratio of the liquid crystal display apparatus 100 can be increased. Also, a response speed can be increased. In addition, as for the N-type liquid crystal molecules, if a cell gap is 3.4 µm or more, a response speed of the liquid crystal layer 126 may be decreased. Further, if a cell cap is 2.8 µm or less, it may be difficult to control a polarization axis of a polarized light. However, the present disclosure is not limited thereto. Further, an alignment film may be disposed on each of an upper surface and a lower surface of the liquid crystal layer 126. The alignment film may be formed by a non-contact alignment method using ultra-violet rays such that polymers on a surface of the alignment film are aligned in one direction. As a result, liquid crystal molecules in the liquid crystal layer 126 are also aligned by a chemical interaction between the polymers aligned on the alignment film and the liquid crystal layer 126.

The sealing member 128 is configured to surround a lateral surface of the liquid crystal layer 126. The liquid crystal layer 126 has flowability and thus a seal between the first substrate 124 and the second substrate 134 is provided by the sealing member 128. Further, the sealing member 128 supports the first substrate 124 and the second substrate 134 so as to be stably fixed. The sealing member 128 may be cured by heat or by ultra-violet rays, or may be cured by heat and ultra-violet rays.

The components disposed on the second substrate 134 function to implement a color of polarized light passing through the liquid crystal layer 126. In order to express certain colors, a color filter 132 is disposed on the second substrate 134. The color filter 132 includes red, green, and blue color filters 132. The second substrate 134 is formed of a material suitable for deposition of a semiconductor, a metal line, an organic material, or an inorganic material. For example, glass or plastic, such as polyimide, having excellent heat resistance and chemical resistance may be used as the second substrate 134.

A polarization axis of a polarized light incident into the first substrate 124 through the first polarizing film 122 is rotated by rotation of the liquid crystal layer 126. In this case, the degree of rotation of the polarization axis is controlled by an electric field generated corresponding to an image signal.

The second polarizing film 136 may be disposed on the upper surface of the second substrate 134. Further, the second polarizing film 136 functions to absorb light which is incident into the second substrate 134 from the liquid crystal layer 126 and of which a polarization axis is rotated and express a gray level. In this case, the degree of absorption by the second polarizing film 136 corresponds to the degree of rotation of the liquid crystal layer 126.

Hereinafter, the liquid crystal panel 120 of the liquid crystal display apparatus 100 will be described in more detail with reference to FIG. 2A through FIG. 2C.

Figure 2A:
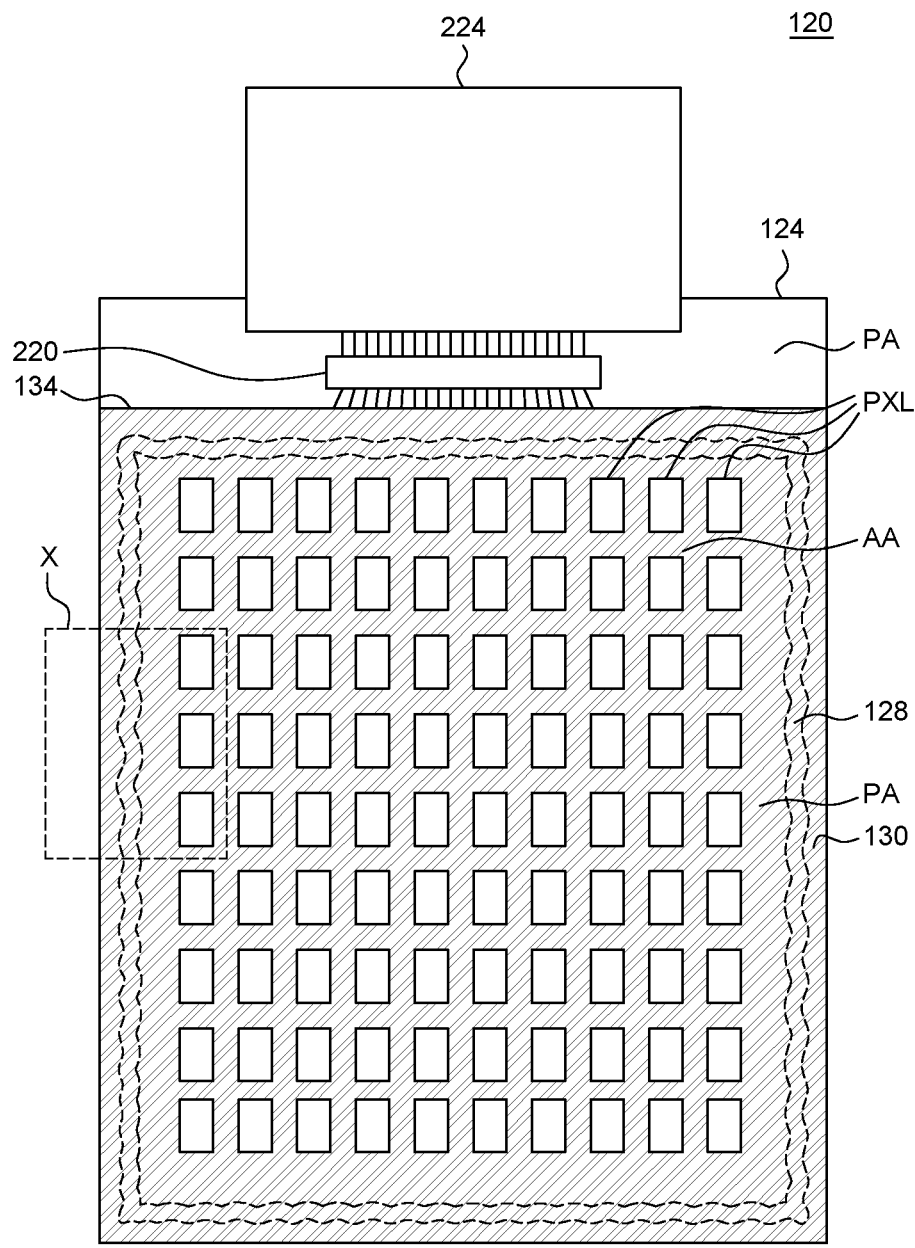
FIG. 2A is a plane view of a liquid crystal panel of a liquid crystal display apparatus according to an exemplary embodiment of the present disclosure.

FIG. 2A is a plane view of a liquid crystal panel of a liquid crystal display apparatus according to an exemplary embodiment of the present disclosure.

Referring to FIG. 2A, the liquid crystal panel 120 of the liquid crystal display apparatus 100 may be divided into a pixel area AA and a peripheral area PA.

Sub-pixels PXL are disposed in the pixel area AA. A sub-pixel PXL refers to a minimum unit capable of outputting light used for displaying an image. The sub-pixels PXL may include red, green, and blue sub-pixels PXL. The sub-pixel PXL may include various components required for the liquid crystal display apparatus 100 to display an image.

Various pads, lines, and driving circuits required to drive the sub-pixels PXL are disposed in the peripheral area PA. Further, the peripheral area PA is configured to surround the pixel area AA.

A data driver 220 is disposed in the peripheral area PA. The data driver 220 may be disposed on at least one side of the peripheral area PA. The data driver 220 converts a digital image signal to an analogue voltage using a gamma voltage. The data driver 220 generates an inversion signal to control the polarity of an analogue voltage corresponding to a common voltage Vcom. The polarity inversion signal functions to suppress damage to the liquid crystal layer 126.

The data driver 220 may be mounted on a pad. A bonding member is disposed on the pad. An anisotropic conductive film (ACF) may be used as the bonding member. The pad corresponding to the data driver 220 may be disposed on the peripheral area PA of the first substrate 124. Such structure may be referred to as, for example, a chip-on-glass (COG) structure. The pad corresponding to the data driver 220 may be disposed on a flexible printed circuit board or a flexible cable. Such a structure may be referred to as, for example, a chip on film (COF) structure.

A flexible printed circuit board 224 may be mounted on a pad. A bonding member is disposed on the pad. The liquid crystal panel 120 may receive a reference voltage, an image signal, and a control signal from the outside through the flexible printed circuit board 224.

A black matrix 130 is disposed in the pixel area AA and the peripheral area PA (as shown by the diagonally hatched area in FIG. 2A). The black matrix 130 is patterned to separate the sub-pixels PXL. The sealing member 128 is configured in the peripheral area PA so as to surround the pixel area AA. Further, the sealing member 128 is configured to be overlapped with the black matrix 130.

Figure 2B:
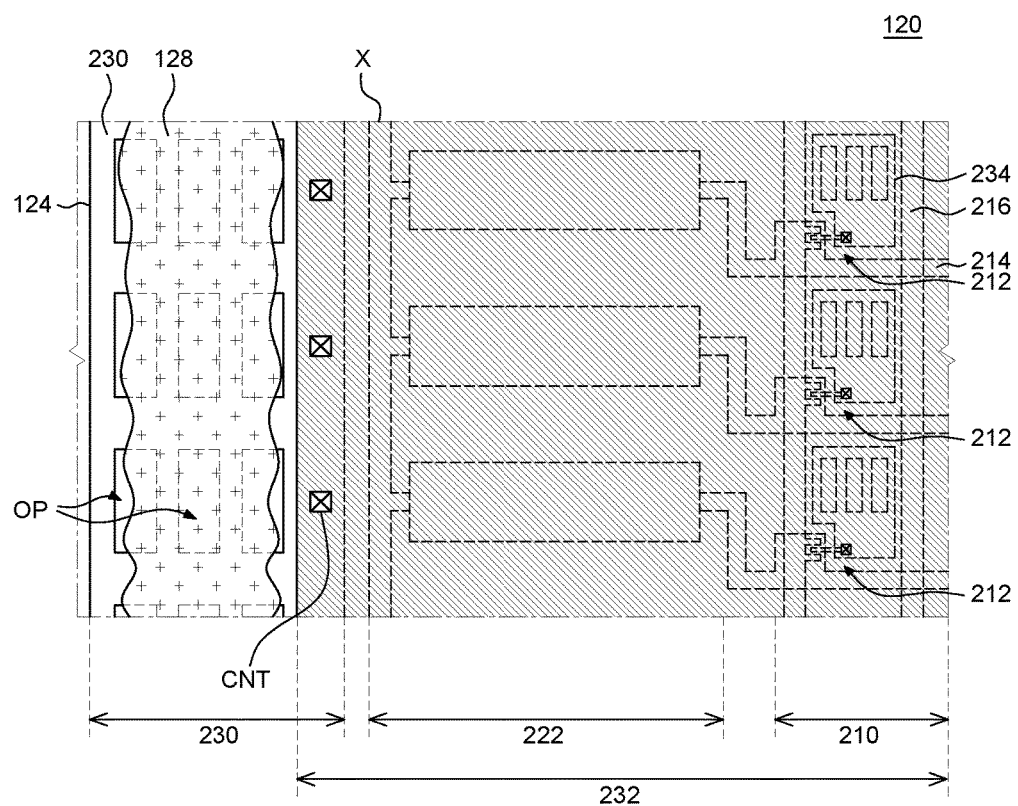
FIG. 2B is an enlarged view of a peripheral area of a first substrate corresponding to an area X of FIG. 2A according to an exemplary embodiment of the present disclosure.

FIG. 2B is an enlarged view of a peripheral area of the first substrate 124 corresponding to an area X of FIG. 2A.

Referring to FIG. 2B, a pixel array 210, the gate driver 222, a common voltage supply unit 230, a common electrode structure 232, and a pixel electrode 234 are disposed on the first substrate 124.

The pixel array 210 includes a thin film transistor 212, a gate line 214, a data line 216, and the like. The pixel array 210 is included in the pixel area AA and configured to apply an image signal to the sub-pixels PXL.

The gate line 214 and the data line 216 are disposed to intersect with each other. For example, the gate line 214 may be extended in a first direction. Further, for example, the data line 216 may be extended in a second direction. However, the extension directions of the gate line 214 and the data line 216 are not limited thereto.

The thin film transistor 212 is disposed adjacent to an intersection of the gate line 214 and the data line 216. If a gate driving signal is applied to the gate line 214 connected to the thin film transistor 212, the thin film transistor 212 is switched to a turn-on state from a turn-off state.

For example, the pixel array 210 may have a rectangular shape, but is not limited thereto. The pixel array 210 may have various shapes such as a circular shape, an oval shape, or a diamond shape.

The gate driver 222 is disposed outside the pixel array 210. The gate driver 222 applies a driving signal, for example, a gate-high voltage VGH as a turn-on voltage and a gate-low voltage VGL as a turn-off voltage, to the gate line 214. The gate driver 222 may be disposed on at least one side of the peripheral area PA. The gate driver 222 and the data driver 220 are disposed on a different side, but are not limited thereto. The gate driver 222 can be disposed on the same side as the data driver 220. The gate driver 222 is configured in a gate-driver in panel (GIP) type. In this case, the gate driver 222 may be formed by the same process as that for the thin film transistor 212.

The common voltage supply unit 230 is disposed outside the gate driver 222. The common voltage supply unit 230 is configured to supply the common voltage Vcom to the common electrode structure 232. The common voltage supply unit 230 may be disposed on at least one side of the peripheral area PA. The common voltage supply unit 230 includes an opening OP. The opening OP may be formed by patterning the common voltage supply unit 230. An aperture ratio (%) of the opening OP of the common voltage supply unit 230 is determined by considering certain characteristics, such as photocurability, of the sealing member 128. A first line width W1 between adjacent openings OP may be determined by considering a load of the pixel area AA.

If the aperture ratio (%) of the opening OP is too low, UV light may not be sufficiently irradiated or exposed. Thus, the sealing member 128 may not be cured properly. If the opening OP is too narrow, a line resistance is increased. Thus, it may be insufficient to bear a load of the pixel area AA. On the contrary to this, if the opening OP is too wide, the width of the bezel is undesirably increased. Thus, it may be difficult to implement a narrow bezel configuration.

Considering the photocurability of the sealing member 128 and the load of the pixel area AA, the aperture ratio (%) of the opening OP may be, for example, at least 50% or more. Further, the first width W1 between the adjacent openings OP may be in the range of from 10 µm to 25 µm, but is not limited thereto.

A line resistance will be described in more detail. Each line is formed of its own conductive material. Each conductive material has a particular resistivity (ρ). Further, a line resistance is determined by the resistivity ρ, a line length L, a line thickness T, and a line width W. The line resistance can be calculated using Equation 1.

$$\text{line resistance} = \frac{\text{line length} \times \text{resistivity} (\rho)}{\text{line thickness} \times \text{line width}} \quad \text{[Equation 1]}$$

The common voltage supply unit 230 includes a contact unit CNT. The contact unit CNT may be disposed to be adjacent to the gate driver 222.

In some exemplary embodiments, the opening OP may be formed of at least one of a triangular shape, a square shape, a polygonal shape, a circular shape, an oval shape, a curved shape, or a free shape, or combinations thereof, but is not limited thereto.

The sealing member 128 is disposed to be overlapped with the common voltage supply unit 230. Further, the sealing member 128 surrounds the liquid crystal layer 126 interposed between the first substrate 124 and the second substrate 134 and supports the first substrate 124 and the second substrate 134. Also, the sealing member 128 is overlapped with the opening OP of the common voltage supply unit 230. The sealing member 128 is photocurable. Since the sealing member 128 can be photocured through the opening OP, the sealing member 128 can be easily cured even if overlapped with the common voltage supply unit 230. Further, after photocuring, thermal curing may be additionally performed in order to increase a bonding force of the sealing member 128. However, the present disclosure is not limited thereto.

The common electrode structure 232 is electrically connected to the common voltage supply unit 230 through the contact unit CNT and supplied with the common voltage Vcom. The common electrode structure 232 is disposed in the pixel area AA and the peripheral area PA. For example, the common electrode structure 232 may be configured to cover the entire pixel area AA. Further, the common electrode structure 232 may be configured to cover the gate driver 222. According to the above-described configuration, the common voltage Vcom is supplied to the pixel array 210 from the common voltage supply unit 230 overlapped with the sealing member 128 in the peripheral area PA through the common electrode structure 232 disposed on the gate driver 222.

The pixel electrode 234 is overlapped with the common electrode structure 232 and configured to generate an electric field corresponding to an image signal and control the liquid crystal layer 126. The pixel electrode 234 is patterned so as to correspond to the sub-pixels PXL. The pixel electrode 234 is connected to the thin film transistor 212 of the pixel array 210. Further, the pixel electrode 234 may receive an image signal from the data line 216 when the thin film transistor 212 is in a turn-on state.

For example, the pixel electrode 234 may have a comb teeth, rib or slit shape. The comb teeth of the pixel electrode 234 may have, for example, straight-line segments and may have a bent or angled portion(s) to implement so-called multi-domain characteristics.

A shape having a predetermined angle may be a zigzag shape including at least one bent portion. The predetermined angle may be an angle of the bent portion.

An area where the pixel electrode 234 and the common electrode structure 232 are overlapped may function as a storage capacitor that stores charged related to an image signal. Further, in this case, a separate opaque metallic storage capacitor may not be needed. Furthermore, an area which can transmit the light emitted from the light source can be increased. Thus, an aperture ratio can be increased. Particularly, the above-described configuration has an advantage of being able to implement a high-resolution liquid crystal panel. Particularly, if the pixel electrode 234 and the common electrode structure 232 are overlapped with each other, it is not necessary to forma separate storage capacitor. Therefore, it is possible to implement a high-resolution liquid crystal panel.

Figure 2C:
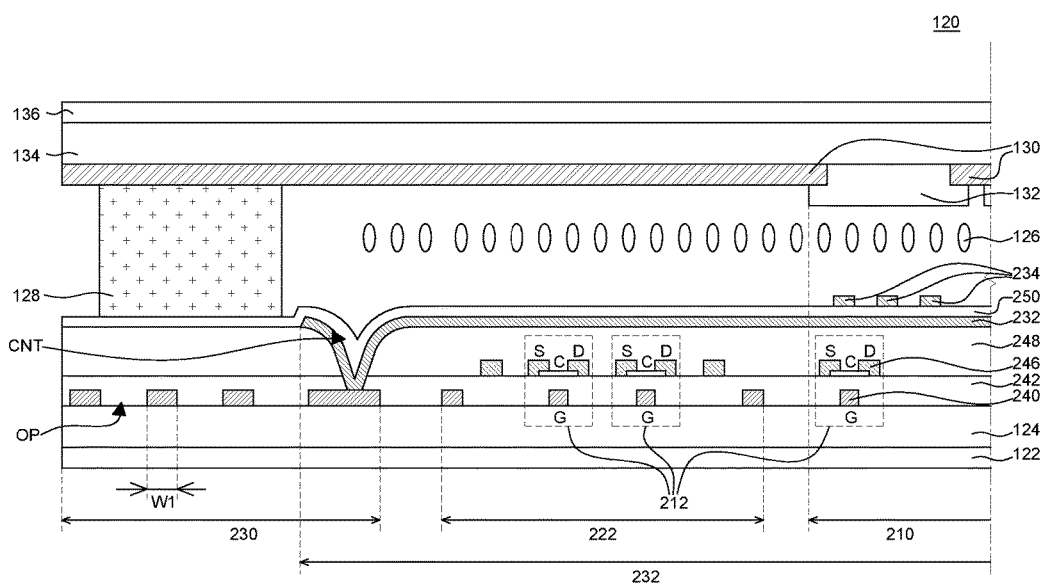
FIG. 2C is a cross-sectional view of a liquid crystal panel of a liquid crystal display apparatus corresponding to the area X of FIG. 2A according to an exemplary embodiment of the present disclosure.

FIG. 2C is a cross-sectional view of the liquid crystal panel 120 corresponding to the area X of FIG. 2A according to an exemplary embodiment.

Referring to FIG. 2C, the liquid crystal panel 120 includes the first polarizing film 122, the first substrate 124, a first metal layer 240, a first insulation layer 242, a semiconductor layer C, a second metal layer 246, an overcoating layer 248, the common electrode structure 232, a second insulation layer 250, the pixel electrode 234, the liquid crystal layer 126, the color filter 132, the second substrate 134, and the second polarizing film 136. In the following, for convenience in explanation, redundant features will be omitted for the sake of brevity.

The first metal layer 240 is disposed on the first substrate 124 to which the first polarizing film 122 is located. The first metal layer 240 is patterned to perform a different function depending on an area where the first metal layer 240 is disposed.

For example, in an area for the pixel array 210, the first metal layer 240 may function as the gate line 214 and the gate electrode G of the thin film transistor 212.

For example, in an area for the gate driver 222, the first metal layer 240 may function as apart of a shift register. In this case, the first metal layer 240 may be a part of a plurality of signal lines, contact holes, thin film transistors constituting the shift register of the gate driver 222.

For example, in an area for the common voltage supply unit 230, the first metal layer 240 may be the common voltage supply unit 230 including the opening OP.

The first metal layer 240 may be formed of a metal material having a low electrical resistance. For example, the first metal layer 240 may be formed of metal such as copper (Cu), aluminum (Al), aluminum-neodymium (AlNd), molybdenum (Mo), and titanium (Ti) or alloys thereof. Further, the first metal layer 240 may be formed of a stacked structure thereof, but is not limited thereto.

The first insulation layer 242 is disposed on the first metal layer 240. The first insulation layer 242 covers the first metal layer 240. The first insulation layer 242 may include contact holes. For example, the first insulation layer 242 may be a gate insulation film of the thin film transistor 212.

The first insulation layer 242 is formed of an inorganic material. For example, silicon oxide ($SiO_x$), silicon nitride ($SiN_x$), or aluminum oxide ($Al_2O_3$) may be applied to the first insulation layer 242. However, the present disclosure is not limited thereto and an organic layer may be applied to the first insulation layer 242.

The semiconductor layer C is disposed on the first insulation layer 242. For example, in an area for the pixel array 210, the semiconductor layer C may function as a channel of the thin film transistor 212. For example, in an area for the gate driver 222, the semiconductor layer C may function as a part of the shift register. The semiconductor layer C may be formed of amorphous silicon, oxide semiconductor, or low temperature polysilicon, but is not limited thereto.

The second metal layer 246 is disposed on the first insulation layer 242. A portion of the second metal layer 246 is connected to the semiconductor layer C. The second metal layer 246 is patterned to perform a different function depending on an area where the second metal layer 246 is disposed.

In an area for the pixel array 210, the second metal layer 246 may function as a data line 264. For example, the second metal layer 216 may function as a source electrode S and a drain electrode D of the thin film transistor 212. In an area for the gate driver 222, the second metal layer 246 may function as a part of the shift register. For example, the second metal layer 246 may be a part of a plurality of signal lines, contact holes, thin film transistors constituting the shift register of the gate driver 222.

The second metal layer 246 may be formed of a metal material having a low electrical resistance. For example, the second metal layer 246 may be formed of metal such as copper (Cu), aluminum (Al), aluminum-neodymium (AlNd), molybdenum (Mo), and titanium (Ti) or alloys thereof. Further, the second metal layer 246 may be formed of a stacked structure thereof, but is not limited thereto.

The overcoating layer 248 may be disposed on the second metal layer 246. The overcoating layer 248 may be disposed on the pixel array 210 and the gate driver 222. The overcoating layer 248 covers the second metal layer 246. The overcoating layer 248 may include contact holes. Further, the overcoating layer 248 is disposed on the gate driver 222 and electrically insulates the common electrode structure 232 and the gate driver 222. Therefore, the common electrode structure 232 is extended on the overcoating layer 248 in an outward direction of the pixel array 210. Further, the common electrode structure 232 is electrically connected to the contact unit CNT of the common voltage supply unit 230 disposed outside the gate driver 222.

The overcoating layer 248 is formed of an organic material having a low dielectric constant ε. For example, the overcoating layer 248 may be formed of photoacryl or polyimide having a low dielectric constant ε to a thickness of 1 μm or more, but is not limited thereto.

The common electrode structure 232 is disposed on the overcoating layer 248. In at least an area for the pixel array 210, the common electrode structure 232 is optically transparent so as to allow light from the light source unit 102 to pass through. The common electrode structure 232 may be formed of a material selected from, for example, transparent conductive oxide, indium tin oxide (ITO), indium zinc oxide (IZO), tin oxide ($SnO_2$), zinc oxide (ZnO), graphene, or the like.

The second insulation layer 250 is disposed on the common electrode structure 232. The second insulation layer 250 covers the common electrode structure 232. An alignment film for alignment of the liquid crystal layer 126 may be disposed on the second insulation layer 250. The second insulation layer 250 is formed of an inorganic material. For example, silicon oxide (SiOx), silicon nitride (SiNx), aluminum oxide ($Al_2O_3$), or the like, may be applied to the second insulation layer 250. However, the present disclosure is not limited thereto.

The pixel electrode 234 is disposed on the second insulation layer 250. The pixel electrode 234 and the common electrode structure 232 may constitute the storage capacitor as being overlapped with each other with the second insulation layer 250 interposed there between. In at least an area for the pixel array 210, the pixel electrode 234 is optically transparent so as to allow light from the light source unit 102 to pass through. The common electrode structure 232 may be formed of a material selected from, for example, transparent conductive oxide, indium tin oxide (ITO), indium zinc oxide (IZO), tin oxide ($SnO_2$), zinc oxide (ZnO), graphene, or the like.

That is, the common electrode structure 232, which is disposed on the overcoating layer 248 and the pixel electrode 234 connected to the pixel array 210, which is overlapped with the pixel electrode 234, which is electrically connected to the common voltage supply unit 230 and which is electrically insulated from the pixel electrode 234 by the second insulation layer 250. The above-described alignment structure of the pixel electrode 234 and the common electrode structure 232 may be referred to as, for example, an in-plane switching (IPS) mode, or may be referred to as a fringe field switching (FFS) mode. Otherwise, the above-described alignment structure may be referred to as an advanced high in-plane switching (AH-IPS) mode. In the above-described alignment structure, a separate metallic storage capacitor is not needed. Thus, it is possible to achieve relatively high aperture ratio. Therefore, it is possible to implement the high-resolution liquid crystal display apparatus 100.

The liquid crystal layer 126 is disposed on the second insulation layer 250, and the sealing member 128 is disposed to be overlapped with the common voltage supply unit 230. Further, the sealing member 128 surrounds the liquid crystal layer 126 disposed between the first substrate 124 and the second substrate 134 and supports the first substrate 124 and the second substrate 134. Also, the sealing member 128 is overlapped with the opening OP of the common voltage supply unit 230. The sealing member 128 is photocurable. Since the sealing member 128 can be photocured through the opening OP of the common voltage supply unit 230, the sealing member 128 can be easily cured even if overlapped with the common voltage supply unit 230. After the photocuring, thermal curing may be additionally performed in order to increase a bonding force of the sealing member 128. However, the present disclosure is not limited thereto.

The black matrix 130 is configured to be overlapped with the gate line 214 and the data line 216 of the pixel array 210 in the pixel area AA. The sub-pixels PXL in the pixel area AA may be distinguished by the black matrix 130. The black matrix 130 is configured to cover most of the peripheral area PA. Particularly, if light from the light source unit 102 is discharged through the peripheral area PA, light leakage or the like may occur. Therefore, the black matrix 130 is disposed to block light leakage through the peripheral area PA. Particularly, in the above-described structure, the black matrix 130 shields light in the peripheral area PA. That is, light cannot be irradiated from the upper surface of the second substrate 134. Therefore, photocuring of the sealing member 128 is performed by light irradiated from the rear surface of the first substrate 124. That is, the second substrate 134 includes the black matrix 130 configured to shield light incident into the sealing member 128 through the second substrate 134 in the peripheral area PA.

In the liquid crystal display apparatus 100 according to an exemplary embodiment of the present disclosure, the common voltage supply unit 230 including the opening OP may be overlapped with the sealing member 128, as described above. Therefore, it is possible to sufficiently bear a load of the liquid crystal panel 120 and also possible to reduce the width of the peripheral area PA. Further, the black matrix 130 of the second substrate 134 can shield light in the peripheral area PA, and, thus, light leakage does not occur. Furthermore, even if the gate driver 222 is disposed, the gate driver 222 is covered by the overcoating layer 248. Thus, in a structure integrated with the gate driver 222, the width of the peripheral area PA can be reduced.

That is, the liquid crystal display apparatus 100 according to an exemplary embodiment of the present disclosure includes: the pixel area AA including the pixel array 210 disposed on the first substrate 124; the peripheral area PA including the gate driver 222 disposed outside the pixel array 210 and the common voltage supply unit 230 including the openings OP disposed outside the gate driver 220; the overcoating layer 248 disposed on the pixel array 210 and the gate driver 222; the pixel electrode 234 disposed on the overcoating layer 248 and connected to the pixel array 210; the common electrode structure 232 disposed on the overcoating layer 248, overlapped with the pixel electrode 234, and electrically connected to the common voltage supply unit 230; and the sealing member 128 surrounding the liquid crystal layer 126 disposed between the first substrate 124 and the second substrate 134 facing face the first substrate 124, supporting the first substrate 124 and the second substrate 134, and overlapped with the opening OP.

Further, the opening OP may be formed of at least one of a triangular shape, a square shape, a polygonal shape, a circular shape, an oval shape, a curved shape, or a free shape, or combinations thereof.

Furthermore, in the peripheral area PA, the black matrix 130 configured to shield a light incident into the sealing member 128 through the second substrate 134 is further included. The common electrode structure 232 may be formed of transparent conductive oxide.

Also, the pixel array 210 and the gate driver 222 may include a plurality of thin film transistors 212 including at least the first metal layer 240, the semiconductor layer C, the first insulation layer 242, and the second metal layer 246. The common voltage supply unit 230 may include at least one metal layer of the first metal layer 240 and the second metal layer 246.

Further, the common electrode structure 232 may be extended from the pixel area AA to the common voltage supply unit 230 disposed in the peripheral area PA and may be in contact with the common voltage supply unit 230. At least a portion of the contact unit CNT where the common electrode structure 232 is in contact with the common voltage supply unit 230 may be overlapped with the sealing member 128.

Furthermore, the common electrode structure 232 may be disposed on the overcoating layer 248. Also, the common electrode structure 232 may be extended from the pixel area AA to the outside of the gate driver 222 so as to be connected to the common voltage supply unit 230 through the contact unit CNT outside the gate driver 222.

According to the above-described structure, the width of the sealing member 128 of the first substrate 124 and the second substrate 134 can be increased. Therefore, a bonding force between the first substrate 124 and the second substrate 134 can be increased. Further, even if the width of the common voltage supply unit 230 is increased so as to correspond to the width of the sealing member 128, the width of the peripheral area PA is substantially not increased. A line resistance of the common voltage supply unit 230 may be decreased. Therefore, the above-described structure has an advantage of being able to reduce the width of the peripheral area PA.

In some exemplary embodiments, the common electrode structure 232 is not overlapped with the sealing member 128.

In some exemplary embodiments, the common electrode structure 232 is overlapped with the sealing member 128. In this case, the common electrode structure 232 needs to be optically transparent. Specifically, the common electrode structure 232 needs to pass light having a wavelength capable of curing the sealing member 128.

Figure 3A:
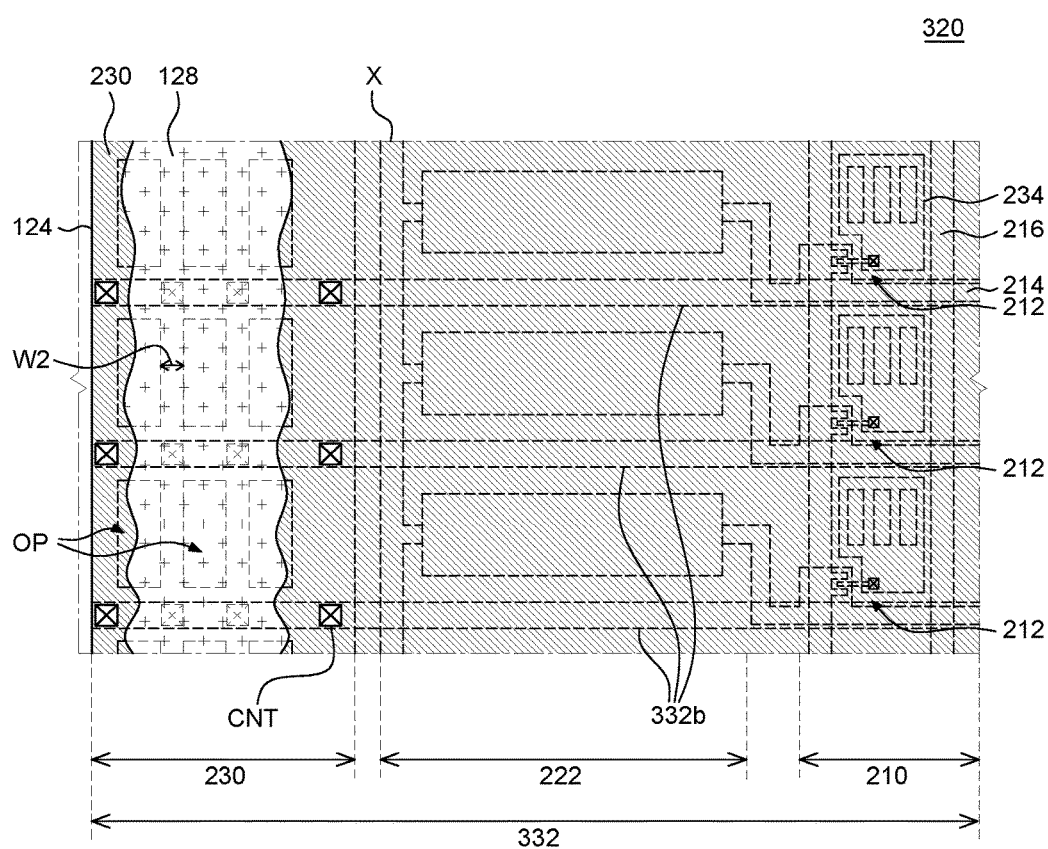
FIG. 3A is an enlarged view of a peripheral area of a first substrate of a liquid crystal panel of a liquid crystal display apparatus according to another exemplary embodiment of the present disclosure.
Figure 3B:
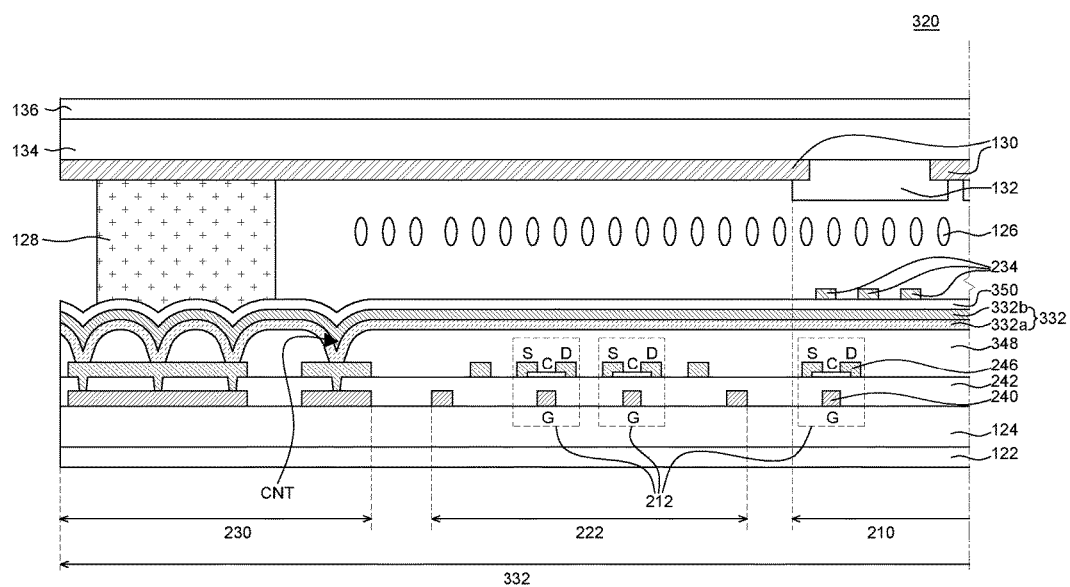
FIG. 3B is a cross-sectional view of the liquid crystal panel of the liquid crystal display apparatus corresponding to FIG. 3A according to an exemplary embodiment of the present disclosure.

FIG. 3A is an enlarged view of a peripheral area of a first substrate of a liquid crystal panel of a liquid crystal display apparatus according to another exemplary embodiment of the present disclosure. FIG. 3B is a cross-sectional view of the liquid crystal panel of the liquid crystal display apparatus corresponding to FIG. 3A according to an exemplary embodiment of the present disclosure.

Referring to FIG. 3A and FIG. 3B, a common electrode structure 332 of a liquid crystal panel 320 of a liquid crystal display apparatus may further include a first common electrode layer 332a and a second common electrode layer 332b.

The first common electrode layer 332a is optically transparent so as to pass light from the light source unit 102. For example, the first common electrode layer 332a may be formed of transparent conductive oxide. However, the transparent conductive oxide has a higher electrical resistance than common metal. Thus, if the liquid crystal panel 320 of the liquid crystal display apparatus 100 is increased in size, the common voltage Vcom decreases at a central portion of the pixel area AA, which may cause deterioration in image quality. That is, the storage capacitor formed by overlapping the common electrode structure 232 with the pixel electrode 234 has an advantage of being able to implement the high-resolution liquid crystal display apparatus 100. However, since the common electrode structure 232 formed of transparent conductive oxide is configured to cover the pixel area AA, it is difficult to manufacture the storage capacitor to a large size.

The second common electrode layer 332b is disposed on the first common electrode layer 332a. The second common electrode layer 332b is formed as a conductive metal line having a low electrical resistance such that a decrease of the common voltage Vcom can be minimized up to the central portion of the pixel area AA. Generally, conductive metal having a low electrical resistance is optically opaque. For example, the second common electrode layer 332b may be formed of metal such as copper (Cu), aluminum (Al), aluminum-neodymium (AlNd), molybdenum (Mo), and titanium (Ti) or alloys thereof. Further, the second common electrode layer 332b may be formed of a stacked structure thereof, but is not limited thereto.

That is, a material of the first common electrode layer 332a has a higher electrical resistance than a material of the second common electrode layer 332b. The second common electrode layer 332b may be formed of a bar shape extended in the same direction as the gate line 214.

The second common electrode 332b is disposed on the first common electrode layer 332a. In the pixel area AA, the first common electrode layer 332a serves as a common electrode and has a greater area than the black matrix 130. Further, in the pixel area AA, the second common electrode layer 332b serves as an auxiliary electrode line and has a smaller area than the black matrix 130.

Particularly, in the above-described structure, the first common electrode layer 332a is transparent and disposed in the entire pixel area AA. Thus, the first common electrode layer 332a has the greatest area. The second common electrode layer 332b is opaque and disposed to be covered with the black matrix 130. If the second common electrode layer 332b has a greater area than the black matrix 130 or is not overlapped with the black matrix 130, an aperture ratio (%) of the pixel area AA may be decreased.

At least a portion of the second common electrode layer 332b is overlapped with the gate line 214. Further, the second common electrode layer 332b may be extended in the same direction as the gate line 214 as being overlapped with the gate line 214. This is because the gate line 214 has a greater width than the data line 216 according to some exemplary embodiments of the present disclosure. If the second common electrode layer 332b is extended in the same direction as the data line 216, the width of a line of the second common electrode layer 332b can be reduced. That is, extension in the same direction as the gate line 214 is effective in further reducing a line resistance.

In some exemplary embodiments, the second common electrode layer 332b may be formed of a mesh shape rather than a bar shape. According to the above-described structure, it is possible to further reduce line resistance.

Since the second common electrode layer 332b is disposed on the overcoating layer 348, a parasitic capacitance value between the second common electrode layer 332b and the gate line 214 can be reduced structurally.

In order to minimize deterioration in image quality caused by a viewing angle of the liquid crystal display apparatus, the gate line 214, the second common electrode layer 332b, and the black matrix 130 are configured to be overlapped with each other, at least in part.

Specifically, a cross section of the black matrix 130 has a greater width than a cross section of the gate line 214, and the cross section of the gate line 214 has a greater width than a cross section of the second common electrode layer 332b. According to the above-described configuration, the second common electrode layer 332b is covered with the back matrix 130, and, thus, deterioration in image quality may not occur. For example, the width of the cross section of the second common electrode layer 332b needs to be determined by considering a viewing angle of the pixel area AA and a line resistance of the common electrode structure 232. In addition, as the width of the cross section of the second common electrode layer 332b is increased, a line resistance is decreased. In this case, there is a trade-off relationship, and, thus, a viewing angle of the liquid crystal display apparatus is decreased. Further, as a resolution of the liquid crystal display apparatus is increased, the width of the cross section of the black matrix is decreased. Therefore, the width of the line of the second common electrode layer 332b may be determined by considering a size and a resolution of the liquid crystal display apparatus.

The second common electrode layer 332b is extended from the pixel area AA toward the common voltage supply unit 230 disposed in the peripheral area PA. The second common electrode layer 332b may not be overlapped with the sealing member 128 at the contact unit CNT. Particularly, if the second common electrode layer 332b is overlapped with the sealing member 128, light may be shielded and the sealing member 128 may be cured incompletely. Particularly, in such case, defects may be generated.

The common voltage supply unit 230 may be formed of the first metal layer 240 or the second metal layer 242. Otherwise, the common voltage supply unit 230 may be formed of the first metal layer 240 and the second metal layer 242. Particularly, if the common voltage supply unit 230 has a double-layered structure, a line resistance of the common voltage supply unit 230 can be further reduced. Therefore, the width of the peripheral area PA can be further reduced.

Further, if the second common electrode layer 332b is implemented together with the common voltage supply unit 230 having a stacked structure, the line resistance can be further reduced. Therefore, the width of the peripheral area PA can be further reduced.

In some exemplary embodiments, the second common electrode layer 332b may be overlapped with the sealing member 128. In this case, the second common electrode layer 332b may be configured so as not to cover the opening OP of the common voltage supply unit 230. According to the above-described structure, even if the second common electrode layer 332b is overlapped with the sealing member 128, the sealing member 128 can be photocured. Further, since such an additional metal layer is further disposed on the common voltage supply unit 230, the line resistance can be further reduced. That is, the second common electrode layer 332b is extended from the pixel area AA to the common voltage supply unit 230 disposed in the peripheral area PA and overlapped with the common voltage supply unit 230 and the sealing member 128 at the contact unit CNT. However, the second common electrode layer 332b is not overlapped with the opening OP of the common voltage supply unit 230 at the contact unit CNT.

According to the above-described structure, the second common electrode layer 332b is provided. Thus, the width of the peripheral area PA can be further reduced and the size of the liquid crystal display apparatus can be increased.

The liquid crystal panel 320 of the liquid crystal display apparatus according to another exemplary embodiment of the present disclosure is substantially the same as the liquid crystal panel 120 of the liquid crystal display apparatus 100 according to an exemplary embodiment of the present disclosure except the above-described parts. Therefore, redundant explanation will be omitted merely for the sake of brevity.

Figure 4A:
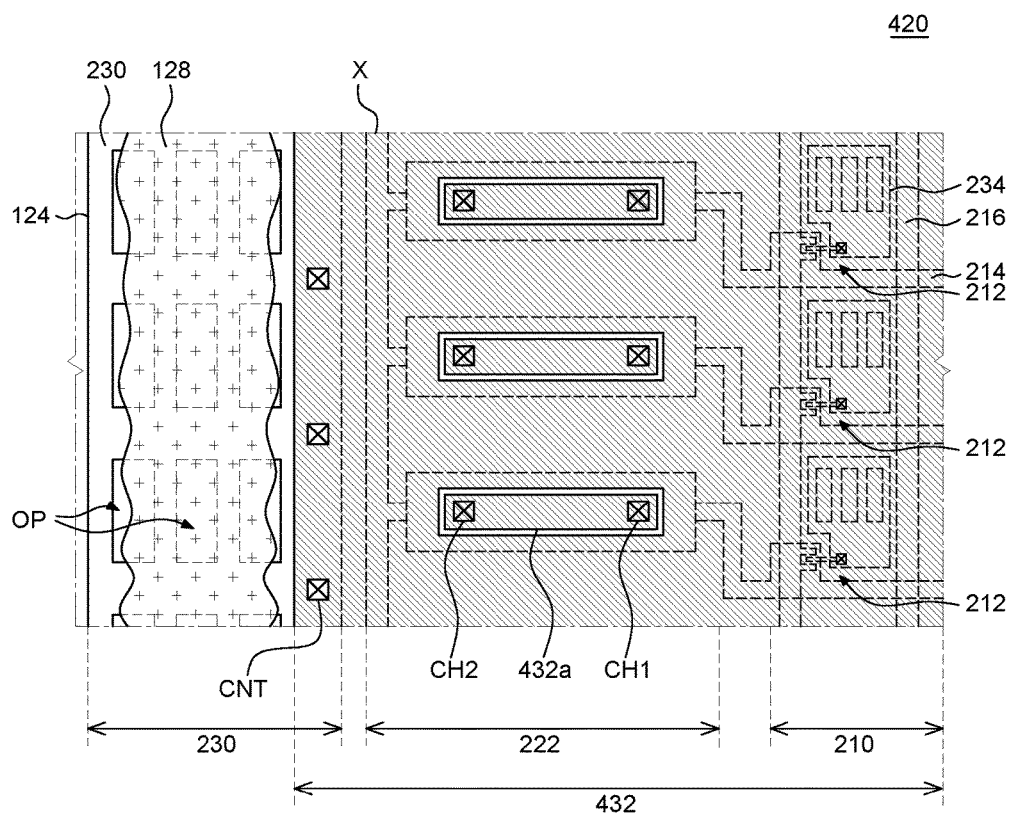
FIG. 4A is an enlarged view of a peripheral area of a first substrate of a liquid crystal panel of a liquid crystal display apparatus according to yet another exemplary embodiment of the present disclosure.
Figure 4B:
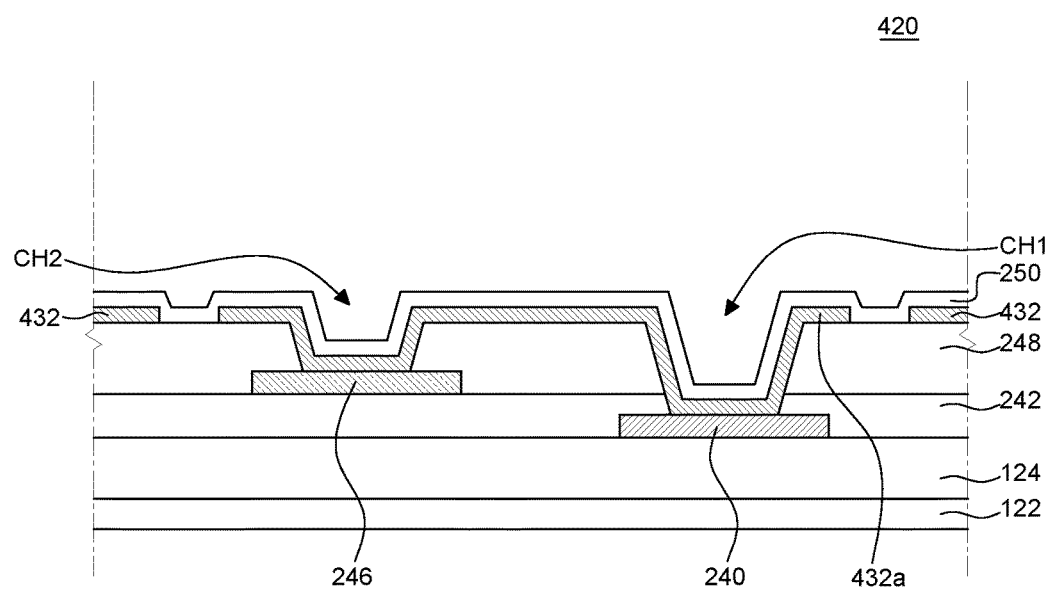
FIG. 4B is a cross-sectional view of the liquid crystal panel of the liquid crystal display apparatus corresponding to FIG. 4A according to an exemplary embodiment of the present disclosure.

FIG. 4A is a plane view provided to schematically explain a liquid crystal panel of a liquid crystal display apparatus according to yet another exemplary embodiment of the present disclosure. FIG. 4B is a plane view provided to schematically explain the liquid crystal panel of the liquid crystal display apparatus according to yet another exemplary embodiment of the present disclosure.

Referring to FIG. 4A and FIG. 4B, a common electrode structure 432 of a liquid crystal panel 420 of a liquid crystal display apparatus further includes a patterned common electrode connector 432a. Further, the overcoating layer 248 on the gate driver 222 further includes a first contact hole CH1 through which the first metal layer 240 of the gate driver 222 is formed and a second contact hole CH2 through which the second metal layer is formed.

The common electrode connector 432a is formed such as an island-shaped electrode electrically insulated from the remainder of the common electrode structure 432 and configured to connect the first contact hole CH1 and the second contact hole CH2 of the gate driver 222. According to the above-described structure, it becomes easier to design the gate driver 222. Particularly, a plurality of thin film transistors and signal lines are disposed within the gate driver 222.

Thus, so-called jump lines for connecting the components may be needed in many cases. Further, if there is no jump line such as the common electrode connector 432a, the design efficiency may deteriorate. Thus, the volume of the gate driver 222 may be increased, resulting in an increase in width of the peripheral area PA.

However, with the above-described common electrode connector 432a, it is possible to reduce the width of the gate driver 222. Further, if the area of the common electrode structure 432 is reduced due to the common electrode connector 432a, the line resistance can be increased. However, according to a combination of the exemplary embodiments illustrated in FIG. 3A and FIG. 3B, it is possible to compensate an increase in line resistance. That is, since the common electrode connector 432a is provided in the gate driver 222, the width of the gate driver 222 can be reduced and the width of the peripheral area PA can also be reduced.

Particularly, the present exemplary embodiment can be combined with other exemplary embodiments of the present disclosure and thus can be carried out concurrently with the other exemplary embodiments. Therefore, the width of the peripheral area PA can be further reduced.

The liquid crystal panel 420 of the liquid crystal display apparatus according to yet another exemplary embodiment of the present disclosure is substantially the same as the liquid crystal panel 120 of the liquid crystal display apparatus 100 according to an exemplary embodiment of the present disclosure except the above-described parts. Therefore, redundant explanation will be omitted merely for the sake of brevity.

Figure 5:
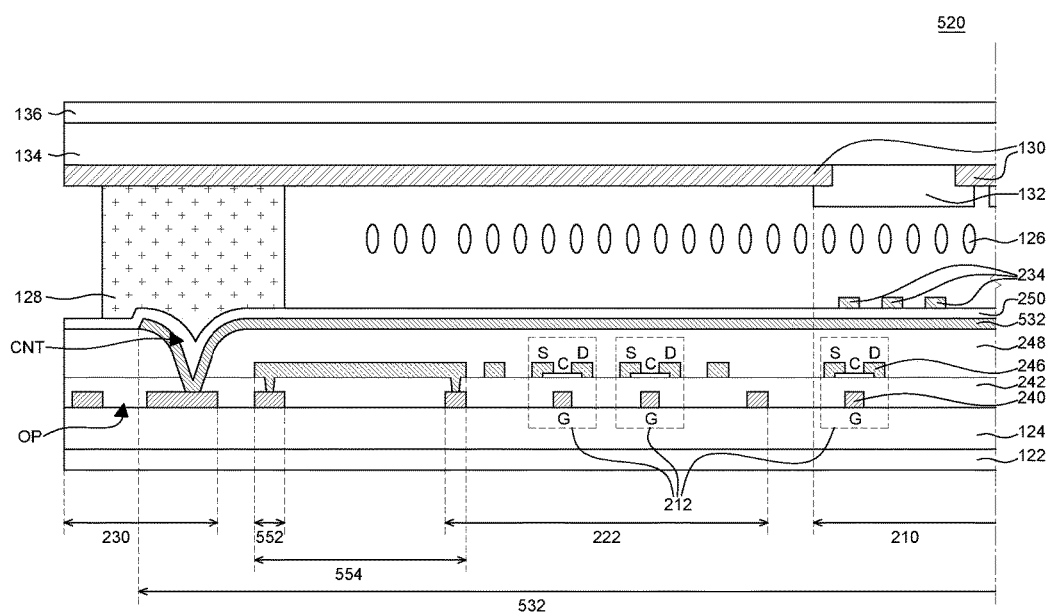
FIG. 5 is a cross-sectional view of a liquid crystal panel of a liquid crystal display apparatus according to still another exemplary embodiment of the present disclosure.

FIG. 5 is a plane view of a liquid crystal panel of a liquid crystal display apparatus according to still another exemplary embodiment of the present disclosure.

Referring to FIG. 5, a gate signal supply unit 552 disposed on one side of the common voltage supply unit 230 of a liquid crystal panel 520 of a liquid crystal display apparatus may be further included.

The gate signal supply unit 552 may be a line for supplying a control signal to the gate driver 222. The gate signal supply unit 552 may be included in the gate driver 222 or may be separately provided.

If the gate signal supply unit 552 is separately provided, the area of the peripheral area PA may be increased due to the gate signal supply unit 552. Therefore, the gate signal supply unit 552 is disposed to be overlapped with at least a portion of the sealing member 128, but is not limited thereto.

In an area where the sealing member 128 and the gate signal supply unit 552 are overlapped, an aperture ratio is at least 50% and the maximum width of the gate signal supply unit 552 is 25 μm or less in order to photocure the sealing member 128.

The liquid crystal panel 520 may further include a gate connector 554 configured to connect the gate signal supply unit 552 and the gate driver 222.

The gate connector 554 is disposed between the gate signal supply unit 552 and the gate driver 222. The gate connector 554 is formed as a metal layer different from the common voltage supply unit 230 and configured to be electrically insulated from the common voltage supply unit 230.

The common voltage supply unit 230 includes the first metal layer 240 and the second metal layer 242 and is disposed outside the gate signal supply unit 552. The common electrode structure 532 is extended to the common voltage supply unit 230 and connected to the contact unit CNT. At least a portion of the contact unit CNT is overlapped with the sealing member 128.

According to the above-described structure, since the gate signal supply unit 552 and the gate connector 554 are provided, various control signals can be supplied to the gate driver 222 without an increase in width of the peripheral area PA.

Particularly, the present exemplary embodiment can be combined with other exemplary embodiments of the present disclosure and thus can be carried out concurrently with the other exemplary embodiments. Therefore, the width of the peripheral area PA can be further reduced.

The liquid crystal panel 520 of the liquid crystal display apparatus according to still another exemplary embodiment of the present disclosure is substantially the same as the liquid crystal panel 120 of the liquid crystal display apparatus 100 according to an exemplary embodiment of the present disclosure except the above-described parts. Therefore, redundant explanation will be omitted for the sake of brevity.

The exemplary embodiments of the present disclosure can also be described as follows:

A liquid crystal display apparatus includes: a pixel area including a pixel array disposed on a first substrate; a peripheral area including a gate driver disposed outside the pixel array and a common voltage supply unit including openings disposed outside the gate driver; an overcoating layer disposed on the pixel array and the gate driver; a pixel electrode disposed on the overcoating layer and connected to the pixel array; a common electrode structure disposed on the overcoating layer, overlapped with the pixel electrode, and electrically connected to the common voltage supply unit; and a sealing member configured to surround a liquid crystal layer disposed between the first substrate and a second substrate facing the first substrate, supporting the first substrate and the second substrate, and overlapped with the openings.

The liquid crystal display apparatus may further include a black matrix configured to shield a light incident into the sealing member through the second substrate in the peripheral area. The common electrode structure may include a first common electrode layer formed of transparent conductive oxide.

The pixel array and the gate driver may include a plurality of thin film transistors including at least a first metal layer, a semiconductor layer, a first insulation layer, and a second metal layer. The common voltage supply unit may include at least one of the first metal layer and the second metal layer.

The common electrode structure may further include a second common electrode layer formed of conductive metal corresponding to the first common electrode layer. A material of the first common electrode layer may have a higher electrical resistance than a material of the second common electrode layer.

The second common electrode layer may be disposed on the first common electrode layer. In the pixel area, the first common electrode layer may be a common electrode and may have a greater area than the black matrix. In the pixel area, the second common electrode layer may be an auxiliary electrode line and may have a smaller area than the black matrix.

At least a portion of the second common electrode layer may be overlapped with a gate line of the pixel array formed of the first metal layer. The second common electrode layer may be extended in the same direction as the gate line.

At least a portion of the gate line, the second common electrode layer and the black matrix may be overlapped. A cross section of the black matrix may have a greater width than a cross section of the gate line. The cross section of the gate line may have a greater width than a cross section of the second common electrode layer. The width of the cross section of the second common electrode layer may be determined by considering a viewing angle of the pixel area and a line resistance of the common electrode structure.

The first common electrode layer may be extended from the pixel area to the common voltage supply unit disposed in the peripheral area and may be in contact with the common voltage supply unit. At least a portion of a contact unit where the first common electrode layer is in contact with the common voltage supply unit may be overlapped with the sealing member.

The second common electrode layer may be extended from the pixel area toward the common voltage supply unit disposed in the peripheral area and may not be overlapped with the sealing member at the contact unit.

The second common electrode layer may be extended from the pixel area toward the common voltage supply unit disposed in the peripheral area, overlapped with the common voltage supply unit and the sealing member at the contact unit. Further, the second common electrode layer may not be overlapped with the openings of the common voltage supply unit at the contact unit.

An aperture ratio of the openings of the common voltage supply unit may be at least 50%, and a distance between adjacent openings among the openings may be 25 µm or less.

The common electrode structure disposed on the overcoating layer may be connected to the common voltage supply unit through a contact unit outside the gate driver in the peripheral area.

The liquid crystal display apparatus further includes: a gate signal supply unit disposed on one side of the common voltage supply unit. A maximum width of the gate supply unit may be 25 m or less. The sealing member may be overlapped with 50% or less with respect to the width of the gate signal supply unit.

The liquid crystal display apparatus may further include a gate connector configured to connect the gate signal supply unit and the gate driver. The common voltage supply unit may be disposed between the gate signal supply unit and the gate driver. The gate connector may be formed of a metal layer different from the common voltage supply unit and electrically insulated from the common voltage supply unit.

The common voltage supply unit may include the first metal layer and the second metal layer and may be disposed outside the gate signal supply unit. The common electrode structure may be extended to the common voltage supply unit and connected to the contact unit. At least a portion of the contact unit may be overlapped with the sealing member.

The common electrode structure may include a patterned common electrode connector, the overcoating layer may include a first contact hole through which the first metal layer of the gate driver is formed and a second contact hole through which the second metal layer is formed, the common electrode connector is configured to electrically connect the first metal layer through the first contact hole and the second metal layer through the second contact hole, and the common electrode connector is electrically insulated from the remainder of the common electrode structure.

In other words, the common electrode structure may be configured to cover the gate driver such that the common voltage supply unit is electrically connected to the common electrode structure. In addition, the common electrode structure may include a plurality of openings and a plurality of the island shaped common electrode connectors arranged within the openings, respectively, wherein the island shaped common electrode connectors are electrically insulated from the common voltage supply unit.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. The protective scope of the present disclosure should be construed based on the following claims, and all the technical concepts in the equivalent scope thereof should be construed as falling within the scope of the present disclosure.

What is claimed is:

1. A liquid crystal display apparatus comprising:
a pixel area including a pixel array disposed on a first substrate;
a peripheral area surrounding the pixel area and including a gate driver disposed outside the pixel array and a common voltage supply unit disposed outside the gate driver including openings;
an overcoating layer disposed on the pixel array and the gate driver;
a pixel electrode disposed on the overcoating layer and connected to the pixel array;
a common electrode structure disposed on the overcoating layer below the pixel electrode, from which the common electrode structure is electrically insulated, wherein the common electrode structure extends beyond the pixel array through the gate driver to a contact unit where it is electrically connected to the common voltage supply unit configured to supply a common voltage to the pixel array through the common electrode structure; and
a sealing member configured to surround a liquid crystal layer disposed between the first substrate and a second substrate facing the first substrate, supporting the first substrate and the second substrate, and overlapped with the openings.

2. The liquid crystal display apparatus according to claim 1, further comprising:
a black matrix configured to shield a light incident into the sealing member through the second substrate in the peripheral area,
wherein the common electrode structure includes a first common electrode layer formed of transparent conductive oxide.

3. The liquid crystal display apparatus according to claim 2, further comprising:
a first metal layer disposed on the first substrate, the first metal layer being patterned to perform a different function depending on an area where the first metal layer is disposed, a first insulation layer disposed on the first metal layer and covering the first metal layer, and
a second metal layer disposed on the first insulation layer, the second metal layer being patterned to perform a different function depending on an area where the second metal layer is disposed,
wherein the pixel array and the gate driver include a plurality of thin film transistors including at least the first metal layer, a semiconductor layer, the first insulation layer, and the second metal layer, and
the common voltage supply unit includes at least one of the first metal layer and the second metal layer.

4. The liquid crystal display apparatus according to claim 3, wherein the common electrode structure further includes a second common electrode layer corresponding to the first common electrode layer and formed of conductive metal, and a material of the first common electrode layer has a higher electrical resistance than a material of the second common electrode layer.

5. The liquid crystal display apparatus according to claim 4, wherein the second common electrode layer is disposed on the first common electrode layer, in the pixel area, the first common electrode layer is a common electrode and has a greater area than the black matrix, and in the pixel area, the second common electrode layer is an auxiliary electrode line and has a smaller area than the black matrix.

6. The liquid crystal display apparatus according to claim 5, wherein at least a portion of the second common electrode layer is overlapped with a gate line of the pixel array formed of the first metal layer, and the second common electrode layer is extended in the same direction as the gate line.

7. The liquid crystal display apparatus according to claim 6, wherein at least a portion of the gate line, the second common electrode layer and the black matrix are overlapped, a cross section of the black matrix has a greater width than a cross section of the gate line, the cross section of the gate line has a greater width than a cross section of the second common electrode layer, and the width of the cross section of the second common electrode layer is determined by considering a viewing angle of the pixel area and a line resistance of the common electrode structure.

8. The liquid crystal display apparatus according to claim 7, wherein at least a portion of a contact unit where the first common electrode layer is in contact with the common voltage supply unit is overlapped with the sealing member.

9. The liquid crystal display apparatus according to claim 8, wherein the second common electrode layer is extended from the pixel area toward the common voltage supply unit disposed in the peripheral area, and the second common electrode layer is not overlapped with the sealing member at the contact unit.

10. The liquid crystal display apparatus according to claim 8, wherein the second common electrode layer is extended from the pixel area toward the common voltage supply unit disposed in the peripheral area, the second common electrode layer is overlapped with the common voltage supply unit and the sealing member at the contact unit, and the second common electrode layer is not overlapped with the openings of the common voltage supply unit at the contact unit.

11. The liquid crystal display apparatus according to claim 3, wherein an aperture ratio of the openings of the common voltage supply unit is at least 50%, and a distance between adjacent openings among the openings is 25 µm or less.

12. The liquid crystal display apparatus according to claim 3, further comprising:

a gate signal supply unit disposed on one side of the common voltage supply unit, wherein a maximum width of the gate supply unit is 25 µm or less, and wherein the sealing member is overlapped with 50% or less with respect to the width of the gate signal supply unit.

13. The liquid crystal display apparatus according to claim 12, further comprising:

a gate connector configured to connect the gate signal supply unit and the gate driver, wherein the common voltage supply unit is disposed between the gate signal supply unit and the gate driver, and the gate connector is formed of a metal layer different from the common voltage supply unit and electrically insulated from the common voltage supply unit.

14. The liquid crystal display apparatus according to claim 12, wherein the common voltage supply unit includes the first metal layer and the second metal layer and is disposed outside the gate signal supply unit, the common electrode structure is extended to the common voltage supply unit and connected to the contact unit, and at least a portion of the contact unit is overlapped with the sealing member.

15. The liquid crystal display apparatus according to claim 3, wherein the common electrode structure further includes a patterned common electrode connector, the overcoating layer further includes a first contact hole overlapping the first metal layer of the gate driver and a second contact hole overlapping the second metal layer, the common electrode connector is configured to electrically connect the first metal layer with the second metal layer through the first contact hole and the second contact hole, and the common electrode connector is electrically insulated from the remainder of the common electrode structure.

* * * * *